United States Patent
Duyanovich et al.

(10) Patent No.: US 7,395,187 B2
(45) Date of Patent: Jul. 1, 2008

(54) SYSTEM AND METHOD FOR RECORDING BEHAVIOR HISTORY FOR ABNORMALITY DETECTION

(75) Inventors: Linda M. Duyanovich, Saratoga, CA (US); Juan C. Gomez, San Jose, CA (US); Kristal T. Pollack, San Jose, CA (US); Sandeep M. Uttamchandani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 11/348,010

(22) Filed: Feb. 6, 2006

(65) Prior Publication Data

US 2007/0198679 A1    Aug. 23, 2007

(51) Int. Cl.
*G06F 11/30* (2006.01)
(52) U.S. Cl. ...................................................... 702/183
(58) Field of Classification Search ......... 702/182–183, 702/186
See application file for complete search history.

(56) References Cited

U.S. PATENT DOCUMENTS

| | | |
|---|---|---|
| 5,124,987 A | 6/1992 | Milligan et al. |
| 5,274,646 A | 12/1993 | Brey et al. |
| 5,278,847 A | 1/1994 | Helbig, Sr. et al. |
| 5,815,649 A | 9/1998 | Utter et al. |
| 5,828,876 A | 10/1998 | Fish et al. |
| 5,964,886 A | 10/1999 | Slaughter et al. |
| 6,384,995 B1 | 5/2002 | Smith |
| 6,639,981 B1 | 10/2003 | Dunn, Jr. et al. |
| 6,789,122 B1 | 9/2004 | Slaughter et al. |
| 7,280,988 B2 * | 10/2007 | Helsper et al. ................. 706/26 |
| 2006/0075306 A1* | 4/2006 | Chandrasekaran ........... 714/38 |
| 2006/0090163 A1* | 4/2006 | Karlsson et al. ............. 718/105 |
| 2006/0253745 A1* | 11/2006 | Maso et al. ................... 714/47 |

FOREIGN PATENT DOCUMENTS

WO    WO 03/054704 A1    7/2003

OTHER PUBLICATIONS

R.L. Ramirez, Jr., "Method for Improved Diagnostic Fault Isolation of Intermittent Multiple Bit Failures in an Interleaved Memory Design", vol. 29, No. 10, Mar. 1987, 2 pages total.

\* cited by examiner

*Primary Examiner*—John E. Barlow, Jr.
*Assistant Examiner*—Aditya S Bhat
(74) *Attorney, Agent, or Firm*—Gibb & Rahman, LLC (57) ABSTRACT

Disclosed is an autonomic abnormality detection device having a plurality of agents, a server with a one or more processors, a data storage device and a corrective actions engine. The device is adapted to detect and diagnose abnormalities in system components. Particularly, the device uses agents to track performance/workload measurements of system components and dynamically compiles a history of those performance/workload measurements for each component. In order to detect abnormalities a processor compares current performance/workload measurements for a component to the compiled histories for that component and for other components. The processor can further be adapted to determine possible causes of a detected abnormality and to report the abnormality, including the possible causes, to a corrective actions engine.

14 Claims, 7 Drawing Sheets

SYSTEM AND METHOD FOR RECORDING BEHAVIOR HISTORY FOR ABNORMALITY DETECTION

BACKGROUND OF THE INVENTION

1. Field of the Invention

The invention generally relates to detection of abnormalities in systems, and, more particularly, to an autonomic system and method that detects and diagnoses system abnormalities by comparing current performance/workload measurements and a dynamically compiled history of performance/workload measurements.

2. Description of the Related Art

Abnormality detection is a core functionality required by many systems such as automated management frameworks. Often abnormality detection is based on violations of quality of service (QoS) goals that are defined by an administrator or service level agreement (SLA). However, these violations of QoS goals are generally not very useful for invoking corrective actions. For example, if a storage system is overloaded and in violation of its QoS goals, the storage system will not automatically move data from the overloaded storage device to a faster storage device. Additionally, while there are a number of systems that monitor system performance, these monitoring systems are rarely used for abnormality detection. For example, a number of management tools monitor runtime information but generally delete it after 4-7 days without analyzing or post-processing it for abnormality detection. Therefore, it would be advantageous to provide an autonomic abnormality detection device for a system that has a plurality of components. Specifically, it would be advantageous to provide an autonomic abnormality detection device that periodically determines current workload to performance characteristics for the different components of a system, detects abnormalities by comparing a current workload to performance characteristic to a dynamically compiled history of workload to performance characteristics, determines the possible causes of a detected abnormality and determines and implements corrective actions, as necessary.

SUMMARY OF THE INVENTION

In view of the foregoing, disclosed are embodiments of an autonomic abnormality detection device (i.e., a framework, system, etc.) for a system (e.g., a data storage system) that has a plurality of components (e.g., host servers, an interconnect network and a plurality of data storage devices). Also disclosed is an associated method of detecting such abnormalities. The abnormality detection device comprises a server with one or more processors for analyzing performance/workload measurements and for detecting abnormalities. The device also comprises a plurality of agents for tracking current performance/workload measurements for the system components and a data storage device for storing performance/workload measurements corresponding to each system component, including a current state table, a history table and a quarantine table. Additionally, the abnormality detection device can comprise a corrective actions engine for analyzing reports of abnormalities, including possible causes, in order to determine necessary or prudent corrective actions and to implement those corrective actions.

Each of the agents of the device is in communication with a corresponding system component and also in communication with the server. Each agent is adapted to periodically determine a current performance/workload measurement (i.e., a workload to performance characteristic) for its corresponding system component and to periodically transmit that current performance/workload measurement to the server. A processor is adapted to input the current performance/workload measurements into the corresponding current state tables within the data storage device. Entered current performance/workload measurements are used to both compile a history of performance/workload measurements for a given component and to detect abnormalities emanating from that component.

Specifically, a processor is further adapted to dynamically compile a history of performance/workload measurements for each component and to input those histories into the corresponding history tables within the data storage device. The history can be compiled by clustering approximately equal performance/workload measurements for a system component into data clusters and determining an average performance/workload measurement for each cluster. This average is entered into the history table. A newly received current performance/workload measurement is then input into either a previously established cluster or into a newly established cluster. A new cluster is established only if the workload value of the current performance/workload measurement is not approximately equal to the workload values of any of the average performance/workload measurement previously entered into the history table. As each current performance/workload measurement is input into a cluster the average performance/workload measurement for that cluster is determined and this new average is entered into the history table for that component. In order to allow for changes in the normal operation of each of the system components over time, the average performance/workload measurement for each of the clusters can be determined by using either a weighted average or a decay function.

Additionally, a processor can be adapted to compare the current performance/workload measurement of each system component (i.e., the most recent performance/workload measurement transmitted by the agent to the server) to the corresponding history for that system component in order to detect an abnormality. In order to detect an abnormality in a current performance/workload measurement the processor can be adapted to identify an average performance/workload measurement in which the workload value is approximately equal to the workload value of the current performance/workload measurement and then, to determine if the current performance/workload measurement is less than or greater than a predetermined value (i.e., outside the predetermined cluster threshold or normal range) from the average performance/workload measurement of the one cluster. Alternatively, in order to detect an abnormality in a current performance/workload measurement the processor can be adapted to use a k-nearest neighbor approach. For example, a predetermined number k is set. The processor is adapted to review the corresponding history table and to identify the k average performance/workload measurement entries with workload values that are closest to the workload value of the current performance/workload measurement. The processor is further adapted to determine a normal range (i.e., a threshold) by using a weighted combined average of the k average performance/workload measurements and then, to determine if the current performance/workload measurement is within the normal range of the combined average.

A current performance/workload measurement that is less than a predetermined value (i.e., within the threshold or normal range) from the average is considered normal. A current performance/workload measurement that is greater than a predetermined value (i.e., outside the threshold or normal range) from the average is considered abnormal. Regardless of whether the current performance/workload measurement is considered normal or abnormal, it is imported into the history table and a new average is determined, as described above.

If an abnormality is detected in a current performance/workload measurement for a given system component, that measurement is also input by the processor into a corresponding quarantine table in the data storage device. The quarantine table comprises a record of detected abnormalities for that system component. A processor can further be adapted to analyze the entries in the quarantine table and to determine if the abnormal current performance/workload measurement is random. For example, a processor can be adapted to compare the number of detected abnormalities stored in the quarantine table to a predetermine abnormality threshold. If the number of abnormalities detected is above the abnormality threshold a determination can be made that the detected abnormality is true and not random. To facilitate making a determination as to whether or not an abnormality is random, the server can be adapted to issue directives to the agents to adjust tracking parameters for the performance/workload measurements (e.g., to decrease the interval at which the measurements are determined).

Additionally, a processor can be adapted to determine possible causes of an abnormality and to report a detected abnormality (including the possible cause) to a corrective actions engine. The determination as to the possible causes of an abnormality can be based on the history of the system component from which the abnormality was detected and on the histories and the current performance/workload measurements of other components in an invocation path of that system component. As mentioned above, the corrective actions engine is in communication with the server and adapted to receive a report of a detected abnormality, including possible causes of the abnormality, to determine what if any corrective actions are necessary or prudent, and to implement the corrective actions within the system.

These and other aspects of embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the embodiments of the invention without departing from the spirit thereof, and the invention includes all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS OF THE INVENTION

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the invention.

As mentioned above, abnormality detection is a core functionality required by many systems such as automated management frameworks. However, many available abnormality detection devices require human attention in order to analyze system behavior. It would be advantageous to provide an autonomic, self-evolving, abnormality detection device and an associated method for detecting system abnormalities. Therefore, disclosed herein is a device (i.e., a framework or system) that periodically determines current workload to performance characteristics for components of a system, compares a current workload to performance characteristic to a dynamically compiled history to detect an abnormality, determines possible causes of the detected abnormality and determines and implements corrective actions, as necessary. More particularly, the device is adapted to track two types of data, the workload imposed on a system and the resulting performance. By tracking this data over time, a database of how the system reacts to different types of workloads is established. By comparing the current performance to the past performance that was experienced under similar workload conditions and contained in the database, abnormalities can be detected. If the performance is persistently different from what has previously been experienced under the same workload conditions, then the abnormality is considered non-random. Based upon knowledge of a system's components and how those components interact, a logic can be built to assist with determining possible causes of an abnormality. Specifically, this logic can be used when examining current and past states of the entire system and, particularly, when examining the current and past states of components in an invocation path of the component from which the abnormality emanated in order to determine possible causes of the detected abnormality. These possible causes are then reported to a corrective actions engine (CAE), which determines whether the abnormality is considered a problem, and if so how to resolve the problem by using various system knobs that may be available to the CAE. Since a history of the system's performance is compiled dynamically, the device can use machine-learning to determine abnormal system behavior and can adapt to changes in workload and system growth.

Figure 1:
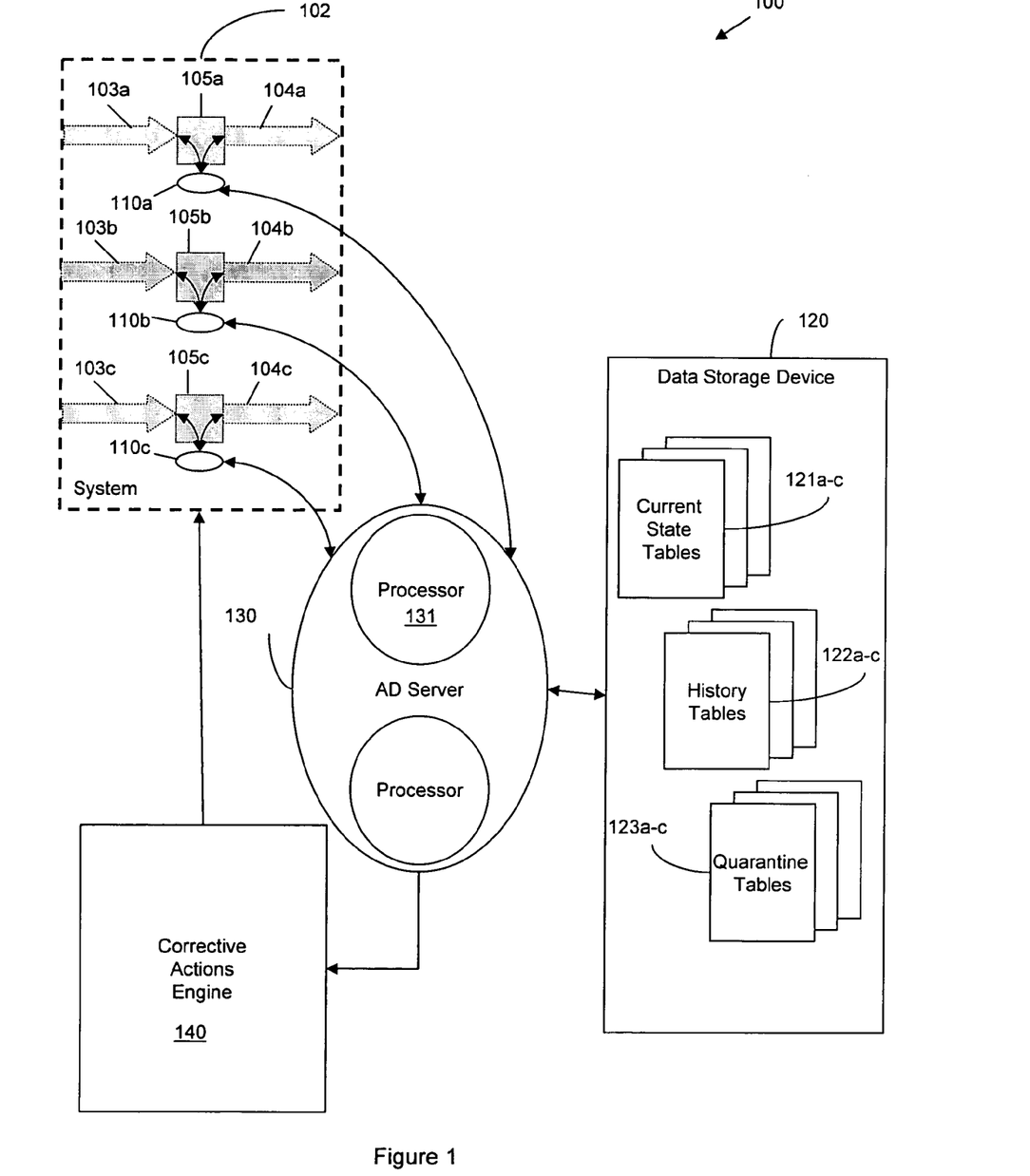
FIG. 1 illustrates a schematic diagram of an embodiment of an abnormality detection device of the invention.

More particularly, referring to FIG. 1, an embodiment of an autonomic abnormality detection device 100 (i.e., an abnormality detection framework or system) for a system 102 (e.g., a data storage system) with a plurality of components 105*a-c* (e.g., host servers, an interconnect network and a plurality of data storage device) comprises a server 130 with one or more processors 131 adapted to analyze performance/workload measurements, to detect abnormalities, and to diagnose those abnormalities. The device 100 also comprises a plurality of agents 110*a-c* adapted to track current performance/workload measurements (i.e., workload to performance characteristics) for the system's individual components 105a-c. A data storage device 120 is used to store performance/workload measurements corresponding to each system component, including a current state table 121a-c for each component, a history table 122a-c for each component and a quarantine table 123a-c for each component. The abnormality detection device 100 can also comprise a corrective actions engine 140 adapted to analyze reports of abnormalities, including possible causes of an abnormality, in order to determine prudent and/or necessary corrective actions and to implement those corrective actions. For example, the abnormality detection device 100 can comprise a corrective actions engine as disclosed and illustrated in the co-pending U.S. Patent Application filed simultaneously herewith entitled "TECHNIQUE FOR MAPPING GOAL VIOLATIONS TO ANAMOLIES WITHIN A SYSTEM", by inventors Duyanovich, et al., and incorporated herein by reference).

Each of the agents 110a-c or daemons of the device 100 is in communication with and hosted by a corresponding system component 105a-c and also in communication with the server. Each agent 110a-c is adapted to periodically determine (i.e., at a predetermined interval) a current performance/workload measurement (i.e., a workload 103a-c to performance 104a-c characteristic) for its corresponding system component 105a-c and to periodically (i.e., at the same or a different predetermined interval) transmit that current performance/workload measurement to the server 130. Specifically, each of the agents 110a-c is in charge of collecting measurements of the workload and the performance for its corresponding host component 105a-c. Data collected by each agent from each component depends on the type and purpose of the component.

For example, in the framework of an internet small computer system interface (iSCSI) protocol, the device 100 can be configured such that every 10 minutes the monitoring agents 110a-c send a report of current performance/workload measurements taken during the 10-minute reporting interval. The workload values 103a-c (i.e., parameters) can include average request size and variance, read/write ratio, random/sequential ratio, input/output operations per second (IOPs), etc. The performance values 104a-c (i.e., metrics) can include average latency, throughput, network packets/second, packets dropped, CPU utilization, memory utilization, etc. The current performance/workload measurements can comprise a single performance/workload measurement taken during the 10-minute reporting period or can comprise a summary (or average) of a plurality of performance/workload measurements that are taken periodically by the agent over a shorter interval (e.g., every 10 seconds) within the 10-minute reporting period. As the plurality of current performance/workload measurements are taken they can be summarized (e.g., averaged) and maintained in a local history, e.g., a local history structured similar to that of the history tables 122a-c described in more detail below. The processor 131 (or one of a plurality of processors) is adapted to input the current (single or averaged) performance/workload measurements received from the agents 110a-c into the corresponding current state tables 121a-c within the data storage device 120. The current state tables 121a-c can be adapted to store raw data (i.e., the current performance/workload measurements) that are received by the server 130 for a predetermined window of time.

The processor 131 (or one of a plurality of processors) is further adapted to dynamically compile a history of performance/workload measurements for each component 105a-c and to input those histories into the corresponding history tables 122a-c within the data storage device 130. The history tables 122a-c store a summary of the performance/workload measurements (i.e., a summary of the workload parameters that have been seen by the system 102 and the corresponding performance). The unique identifier of the history tables 122a-c is the combination of workload parameters for the given component (e.g. workload value 103a of component 105a) and the values they map to are the average performance measurements observed for that component 105a under that workload 103a.

Figure 2:
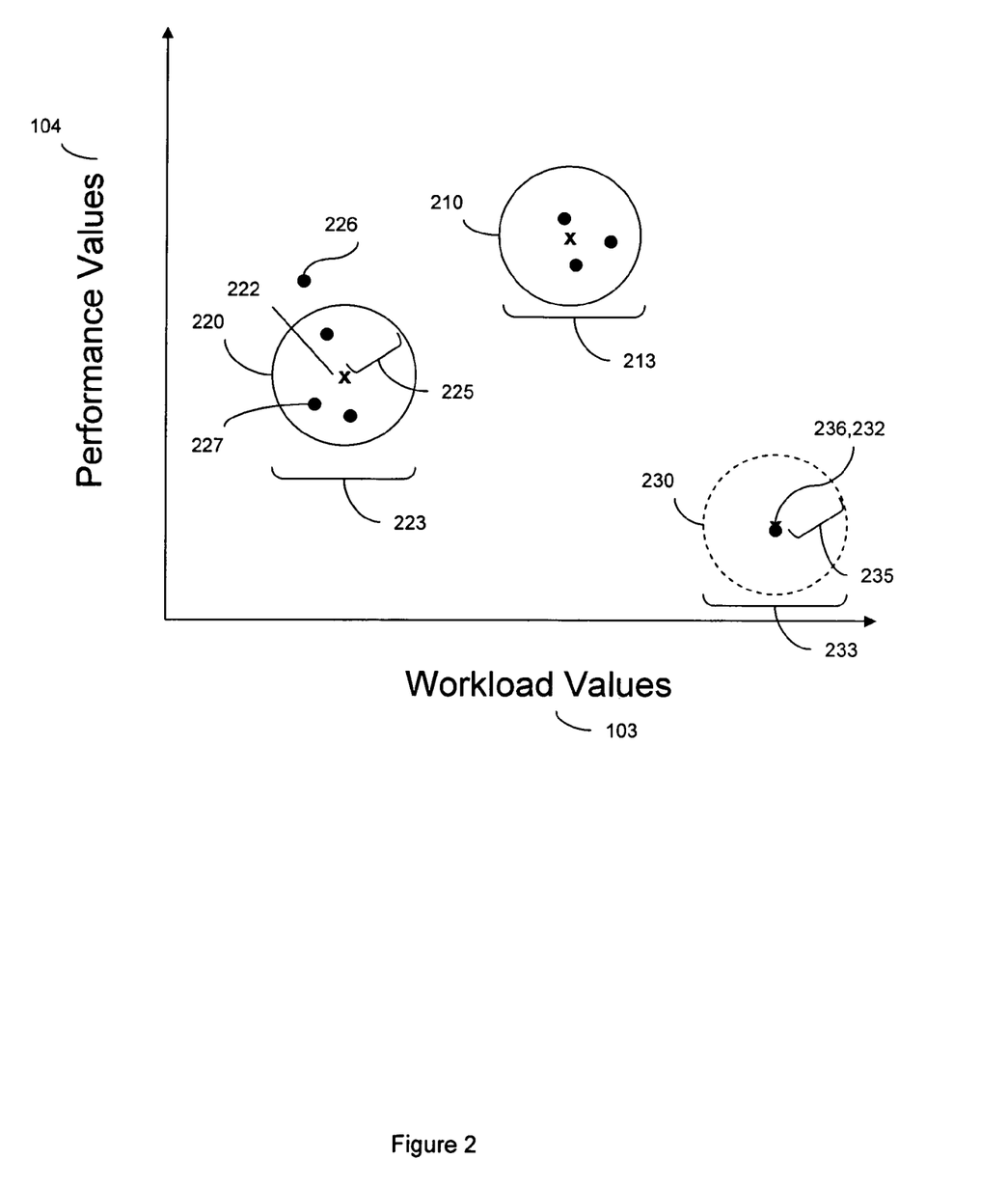
FIG. 2 illustrates a schematic graph of performance values over workload values.

Specifically, to compile the history of performance/workload measurements for a given component, the processor 131 can be adapted to cluster approximately equal performance/workload measurements for a system component (e.g., 105a) into data clusters (e.g., 210, 220, 230) (see FIG. 2). The performance/workload measurements (as represented by dots on the graph of FIG. 2 illustrating performance values 104 over workload values 103) within each cluster are averaged and input into the history table 122a. This average performance/workload value corresponds to the cluster center (e.g., 222, 232) and can be used to establish a workload value range (e.g., 223, 233) and a cluster threshold (e.g., 225, 235) for that cluster. The cluster threshold values 225, 235 may be related to the measured variances of the related metrics or other techniques. In order to allow for changes in the normal operation of each of the system components 105a-c over time, the average performance/workload measurement 222, 232 for each of the clusters 220, 230 can be determined by using either a weighted average or a decay function. Specifically, the inclusion of new performance/workload measurements in the history tables 122a-c is done via a weighted average or a decay function that gives priority to recent history while reducing the weight of old data. The decay factor can be set based on problem correction time, e.g., the decay factor can be based on the most recent performance/workload measurements corresponding to the reaction time window such that after an abnormality is reported it has the most significant share in computing averages and other statistics.

As each current performance/workload measurement is received by the server 130 and input into a corresponding current state table (e.g., current state table 121a), a neighbor search (or k-nearest neighbor search, as described below) is also performed by the processor 131 (or one of a plurality of processors) on the corresponding history table (e.g., 122a) based on the workload value 103 included in the current performance/workload measurement for the given component (e.g., 105a) in order to both compile the history and to detect any abnormality in the current measurement. For example, if for a given current performance/workload measurement (e.g., 206) no average performance/workload measurement entry is found that has an approximately equal workload value, then a new cluster 230 is established and the current performance/workload measurement in imported into the history table 122a. Specifically, if the workload value of the current performance/workload measurement 206 does not fall within any previously established workload value range (e.g., ranges 213 or 223), then a new cluster 230 is established and the current performance/workload measurement 206 is input into the history 122a because there are no other measurements for determining an average 232. If an average performance/workload measurement entry (e.g., 227) in the history table 122a is found to have an approximately equal workload value as that of the current performance/workload measurement (i.e., it is within a range 223) and if the current measurement is within a predetermined value from the average (i.e., it is within the cluster threshold 225), then the current performance/workload measurement 227 is averaged into the cluster 220, as discussed above. However, if an average performance/workload measurement entry (e.g., 226) is found in the history table 122a that has a workload value that is approximately equal to that of the current performance/workload measurement (i.e., it is within the range 223), but the current performance/workload measurement is outside the predetermined value from the average (i.e., it is outside the cluster threshold 225), then the current performance/workload measurement 226 is considered abnormal.

Figure 3:
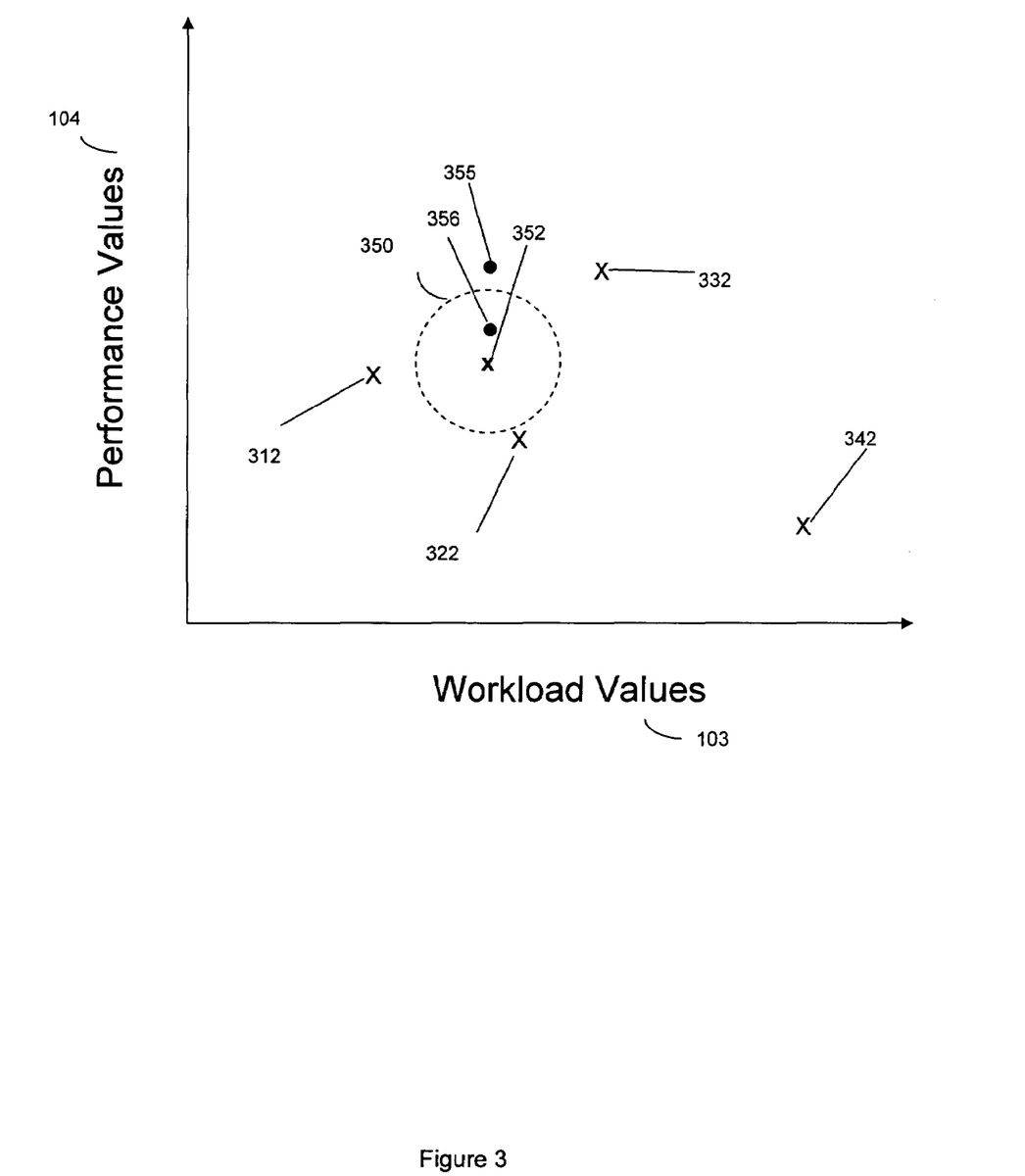
FIG. 3 illustrates another schematic graph of performance values over workload values.

Alternatively, in order to detect an abnormality in a current performance/workload measurement (e.g., 355 or 356) instead of comparing the current performance/workload measurement 355 or 356 to a single entry in the history table, the processor 131 can be adapted to use a k-nearest neighbors approach (see FIG. 3). For example, in a k-nearest neighbors approach a predetermined number k (e.g., 3) of nearest neighbors is set and the workload value of the current performance/workload value is compared to an average of the three nearest neighbors (i.e., a combined average of a predetermined number of averaged performance/workload measurements). Specifically, the processor 131 can be adapted to review the corresponding history table 121a and to identify the three average performance/workload measurement entries (e.g., 312, 322, 332, 342, etc.) with workload values that are closest to the workload value of the current performance/workload measurement. For example, the current performance/workload measurement (355 or 356) has a workload value that is closest to the three workload values for average performance/workload measurements 312, 322, and 332. The processor 131 is further adapted to determine a normal range 350 (i.e., a threshold) around a weighted average 352 of the three average performance/workload measurements 312, 322, and 333, where the average is weighted based on relative closeness to the workload value of the current performance/workload measurement. The processor is further adapted to determine if the current performance/workload measurement 355 or 356 is within the normal range. For example, 356 is within the range and 356 is not.

Those skilled in the art will recognize that other processes may also be used to compare the compiled history of performance/workload measurements to the current performance/workload measurements in order to detect an abnormality. The processes described above are exemplary in nature and should not be considered limiting.

Regardless of the processes used by the processor 131 to detect an abnormality, if an abnormality is detected in a current performance/workload measurement for a given system component, that measurement (e.g., measurement 226 of FIG. 2 or measurement 355 of FIG. 3) is input by the processor 131 (or one of a plurality of processors) into both the corresponding history table 122a, as described above, and into a corresponding quarantine table 123a-c that is also maintained in the data storage device 120. The quarantine tables 123a-c comprise records of detected abnormalities for the corresponding system components 105a-c. Specifically, the quarantine tables 123a-c store the measurements that are deemed abnormal in relation to the other measurements in the history table and can further store the most recent average performance/workload measurement entries from the history table for the current workload value (i.e., the average measurement before the abnormal data point).

The processor 131 (or one of a plurality of processors) can further be adapted to analyze the quarantine tables 123a-c and to determine if an abnormality in a current performance/workload measurement is random. For example, the processor 131 can be adapted to compare the number of detected abnormalities stored in a quarantine table (e.g., 123a) to a predetermine abnormality threshold. If the number of abnormalities detected is above the abnormality threshold a determination can be made that the detected abnormality is true and not random. To facilitate making a determination as to whether or not an abnormality is random, the server 130 can be adapted to issue directives to the appropriate agents (e.g., agent 110a) to adjust tracking parameters for the performance/workload measurements (e.g., to decrease the interval at which the measurements are determined).

Additionally, the processor 131 (or one of a plurality of processors) can further be adapted to determine possible causes of an abnormality and to report a detected abnormality (including the possible cause) to a corrective actions engine 140. For example, a determination as to the possible causes of an abnormality detected from component 105a can be based on the history 122a of the system component 105a and on the histories 122b-c and the current performance/workload measurements 121b-c of other components 105b-c in an invocation path of that system component 105a. The processor 131 can use a simple reasoning system to map the abnormality to a possible cause and to shortlist the possible causes. For instance, if an iSCSI initiator (i.e., a system component) experiences an abnormal drop in throughput, the processor 31 may first look to see if its CPU utilization was also abnormal. An abnormal CPU utilization could indicate that the drop in throughput was due to the initiator being overloaded. Then, the processor 131 may look to see if the target(s) it requests data from experienced an abnormality, which would indicate that the abnormality was a result of a problem with the target. Finally, the processor may look at the initiators that share resources (i.e., the targets) with the abnormal initiator and check to see if their workloads significantly changed during the period the abnormality occurred. This may indicate that a change in other initiators' demands for shared resources caused the abnormality and that the abnormality is a result of unbalanced resources.

As mentioned above, the corrective actions engine 140 is in communication with the server 130 and adapted to receive a report of a detected abnormality, including a shortlist of the possible causes, to determine what if any corrective actions are necessary or prudent, and to implement the corrective actions within the system 102. The short list of possible causes may be used by the corrective actions engine 140 to aid in the discovery of a solution.

Thus, upon initialization of the device 100, all tables (e.g., current state tables 121a-c, history tables 122a-c, and quarantine tables 123a-c) are empty and then the initial current performance/workload measurements received by the server 130 from the agents 110a-c will be considered "normal". As the system evolves and its performance changes for a given workload, abnormalities will be detected and reported to the corrective actions engine 140. The corrective actions engine 140 is adapted to decide whether an abnormality is considered a problem or not and to tune the system performance to desired levels if there is a problem. As mentioned above, abnormal current performance/workload measurements are imported into the history tables. The corrective actions engine 140 may or may not deem an abnormality a problem for a variety of reasons. For example, a perceived abnormality may be the result of a corrective action previously taken by the corrective actions engine 140 and the desired effect is that the performance tends toward the "abnormal performance". If the abnormality is perceived as a problem, the corrective actions engine will take action such that the weighted average of the performance/workload measurement contained in the history tables 122a-c will be pulled towards the desired performance value, which will eventually be consider normal.

Workload-performance maps of device 100 can be applied to individual components or devices (e.g., 105a-c) of the system 102 or the system 102 as a whole. While the description above is focused on finding abnormalities at the component level, similar techniques can be applied to the system as a whole. The goal of applying the technique to the system as a whole is to detect device abnormalities that are not system abnormalities. For example, consider two iSCSI initiators being served by a single target. Originally a single initiator is active and it can obtain a throughput of 70 MB/sec applying a sequential read workload to the target. Suddenly, and with no change in the workload, its read throughput is reduced to 35 MB/sec. Although this event would be detected as a component abnormality by the device 100, such throughput reduction can be considered normal system behavior if the second initiator started to apply a similar sequential read workload at the time the reduction in throughput was observed by the first initiator. Collective abnormality detection requires the existence of aggregate history tables where total workload is mapped to total system performance. The techniques to maintain such tables and detect abnormalities at system level are similar to those just described for individual devices.

Those skilled in the art will recognize that the abnormality detection device 100, as described above, not necessarily a replacement for service level agreement (SLA)-based abnormality detection systems. In SLA-based systems the notion of normal system behavior is injected externally and, particularly, not derived from a dynamically compiled history. The abnormality detection device 100 can complement SLA-based systems by using detected abnormalities to trigger throttling requests. Additionally, the abnormality detection device 100 can be used to detect Service Level Objectives (SLOs) violations in addition to the abnormalities mentioned. SLOs support is an orthogonal issue relative to abnormality detection. An SLO that is not satisfied can be detected in the same manner as an abnormality and recognized as a problem according to the SLO that is not being satisfied. The SLO violation can then be fed into the processor 131 to diagnose the problem and determine the possible cause before being sent to the corrective actions engine 140 tuning module to correct.

Embodiments of the device 100 can take the form of an entirely hardware embodiment, an entirely software embodiment or an embodiment including both hardware and software elements. In a preferred embodiment, the invention is implemented using software, which includes but is not limited to firmware, resident software, microcode, etc. Furthermore, embodiments of the device 100 can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Figure 4:
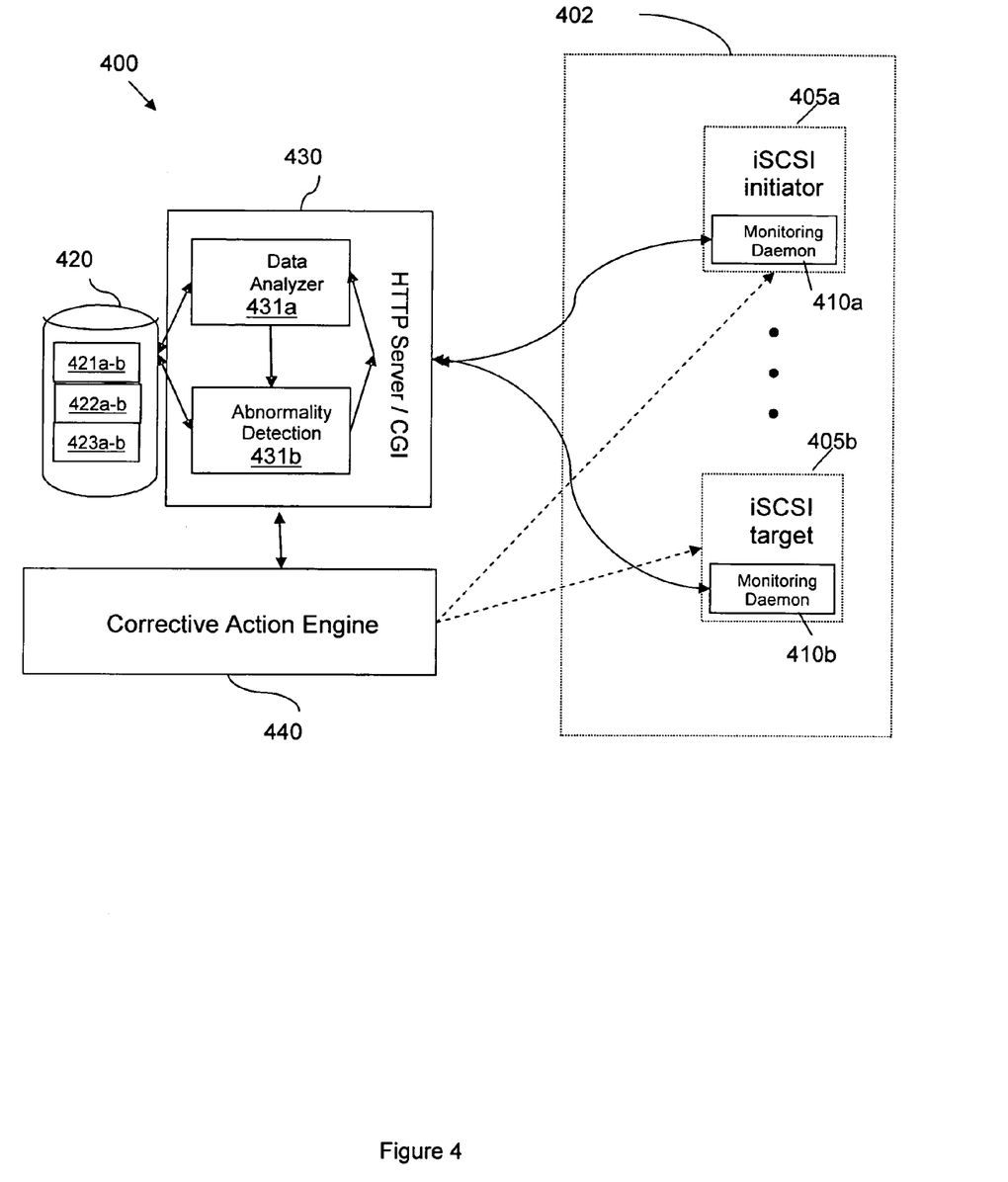
FIG. 4 illustrates a schematic diagram of another embodiment of an abnormality detection device of the invention.

Referring to FIG. 4, an exemplary embodiment of an abnormality detection device 400 is illustrated in the framework of an iSCSI protocol. When the server 430 receives an update from an agent (e.g., 410a or 410b) hosted by a system component (e.g., initiators 405a or 405b), the information is recorded in a current state table (e.g., 421a or 421b) in the database 420. This triggers the processor or one of a plurality of processors (e.g., an abnormality detection module 431b) to examine the information received for abnormalities. If an abnormality is detected, then the performance/workload measurements are recorded in a quarantine table (e.g., 423a or 423b) maintained in the database 420. If an abnormality is not detected, then the current measurements are simply averaged into to the history table (e.g., 422a or 422b) that is also maintained in the database 420.

For example, an entry can be received to update the current state table 421a of the iSCSI initiator 410a and that entry can have workload values including an average request size of 63K±8K, a read/write ratio of 1.5, a random/sequential ration of 0.8, and an IOPs of 500. Additionally, the performance measured for this workload could include an average round-trip time of 120 ms and a throughput of 3 MB/s. The abnormality detection module 431b is adapted to compare this current performance/workload measurements to a very similar entry in the history table 422a in terms of workload parameters and finds that the average round trip time was 30 ms and the throughput was 10 MB/s. This difference having a factor of 4 is beyond a predetermined threshold and causes the current entry to be sent to the quarantine table 423a where an abnormality signal is generated. If the performance measurements had been similar to what was in the history table 422a (i.e., within a predetermined threshold), it would have been considered normal and merged with an entry in the history table. If no similar workload parameters are contained in the history table 422a, a nearest neighbor search can be performed in the history table and upper and lower bounds can be estimated for the state from similar parameters. These bounds can be used to decide if the performance is abnormal.

When an abnormality is added to the quarantine table 423a in the database 420, the abnormality module 431a is triggered to examine the abnormality and determine if it is just random noise or if it relates to other abnormalities. Depending on a desired reaction time, a predetermined abnormality threshold is established before reporting the abnormality to a corrective actions engine 440. For example, the abnormality threshold can establish the number of times the same or similar abnormalities are detected from the affected device and any related behaviors for other interacting devices. The abnormalities are maintained in the quarantine table 423a for at least as long as the reaction time. In order to more accurately determine the frequency and periodicity of possible abnormalities, the abnormality detection server (ADS) 430 can send a request back to the agent 410a of a component 405a in order to decrease the reporting interval to the server 430 or the measurement window it uses. This further helps to distinguish abnormalities as persistent events from random noise.

Figure 5:
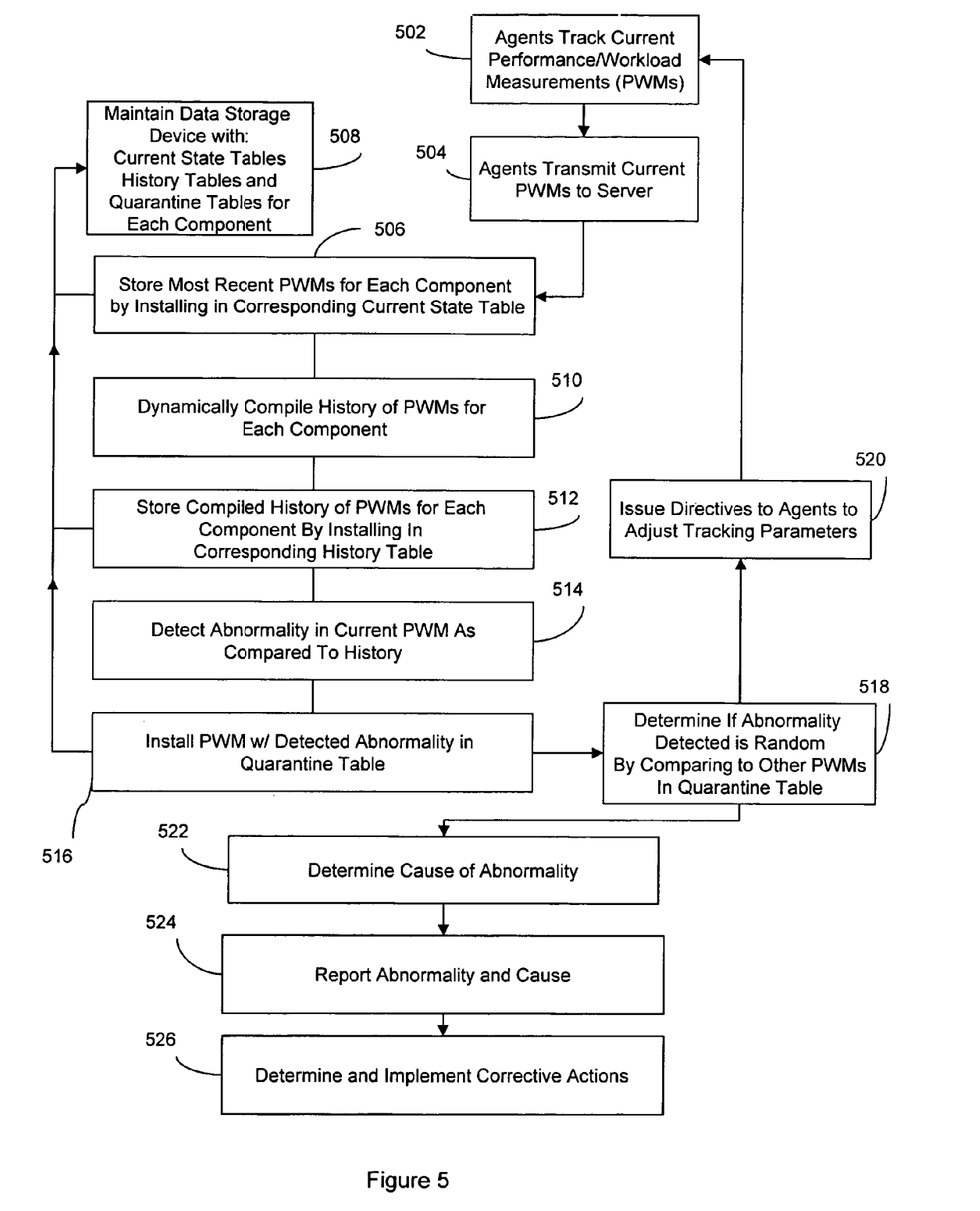
FIG. 5 is a schematic flow diagram illustrating an embodiment of a method of detecting abnormalities.

Referring to FIG. 5 in combination with FIG. 1, disclosed is an embodiment of a method of detecting abnormalities in a system 102 that has a plurality of components 105a-c. The method comprises using a plurality of agents (or daemons) 110a-c to periodically determine a current performance/workload measurement for each of the system 102 components 105a-c (502). The current performance/workload measurements are transmitted to a server 130 (502) and then stored in current state table 121a-c that is maintained in a data storage device 120 (506 and 508). Once each current performance/workload measurement is entered into a corresponding current state table (e.g., 121a), that current performance/workload measurement is also used to compile a history of the component (at process 510) and to detect an abnormality in the system (at process 514). Specifically, the current performance/workload measurements are used to dynamically compile a history of performance/workload measurements for each of the components (510). Each complied history is stored in a corresponding history table 122a-c that is maintained in the data storage device 120 (512 and 508). Each current performance/workload measurement in a current state table 121a-c is also compared to the corresponding history of the system component in the history table 122a-c to detect an abnormality in the current performance/workload measurement for each of the components (514). Any detected abnormalities are stored in a quarantine table (i.e., a record of detected abnormalities) in the data storage device (516).

Figure 6:
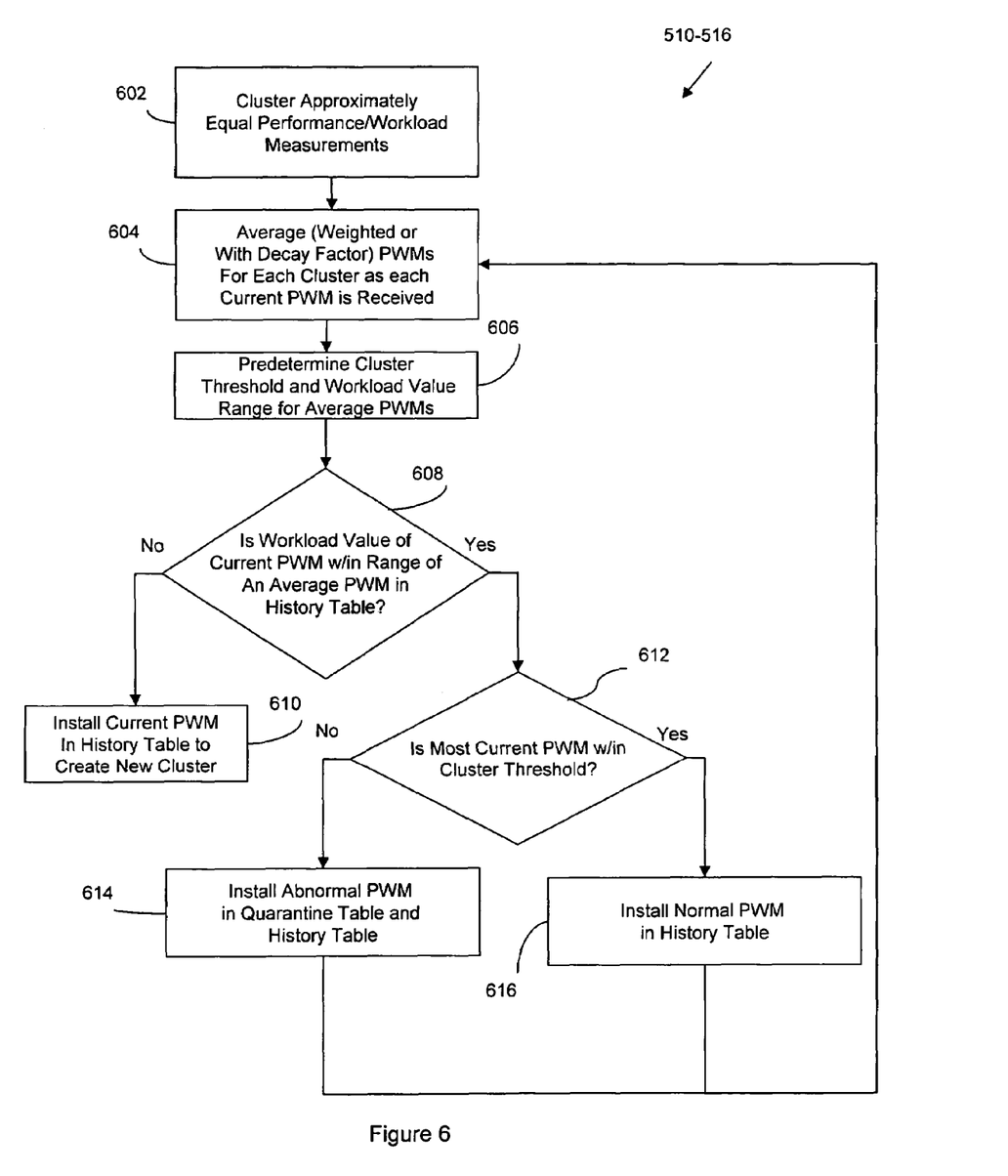
FIG. 6 is a schematic flow diagram further illustrating the method of FIG. 5.

Referring to FIG. 6, the history of performance/workload measurements for each component can be dynamically compiled, for example, by clustering approximately equal performance/workload measurements for a system component (e.g., 105a) into data clusters (e.g., 210, 220, 230, as illustrated in FIG. 2) (602). Then, as each current performance/workload measurement is received by the server 130 it is either averaged into a previous data cluster or used to establish a new data cluster (604). An average performance/workload measurement corresponds to a cluster center (e.g., 222 or 232) and is entered into the history table (e.g., 122a) for the corresponding component (e.g., 105a). This average performance/workload measurement entry is then used to establish a predetermined workload value range (e.g., 223, 233) which is used (at process 608 discussed below) to determine if a workload value of a current performance/workload measurement is approximately equal to the workload value of the average performance/workload measurement of a cluster (606). The average performance/workload measurement corresponding to each cluster is also used to a predetermined cluster threshold (e.g., 225, 235) which is used (at process 612 discussed below) to detect an abnormality (606).

More particularly, as each current performance/workload measurement is received a neighbor search of the corresponding history table (e.g., 122a) is performed to identify an average performance/workload measurement having a workload value that is approximately equal to that of the current performance/workload measurement. In other words, the history table is reviewed to determine if the workload value of the current performance/workload measurement for a given component is within a predetermined workload value range for any of the average performance/workload measurements entered in the table (608). If for a given current performance/workload measurement no average performance/workload measurement entry is identified with an equivalent workload value, then a new cluster is established and the current performance/workload measurement in imported into the corresponding history table (610). For example, if the workload value 103 of a current performance/workload measurement (e.g., measurement 206) does not fall within any previously established workload value range (e.g., ranges 213 or 223), then a new cluster 230 is established and the current performance/workload measurement is entered into the corresponding history table (e.g., history table 122a) because there are no other measurements for determining an average 232 of the new cluster 230. If on the other hand a current performance/workload measurement has a workload value that is considered approximately equal to a workload value of an identified average performance/workload measurement entry in the history table, then a determination is made as to whether the current performance/workload measurement is within a predetermined value from that average performance/workload measurement (612). For example, since the current performance/workload measurement 227 has a workload value that is within a workload value range 223 around the average measurement 222 and since that measurement 227 is within the cluster threshold 225 from an average performance/workload measurement entry 222, then the current performance/workload measurement 227 is averaged into the cluster 220, as discussed above (at process 604). However, since the current performance/workload measurement 226 has a workload value that is within the workload value range 223 around the average measurement 222, but is outside the cluster threshold 225, then the current performance/workload measurement 226 is considered abnormal.

Figure 7:
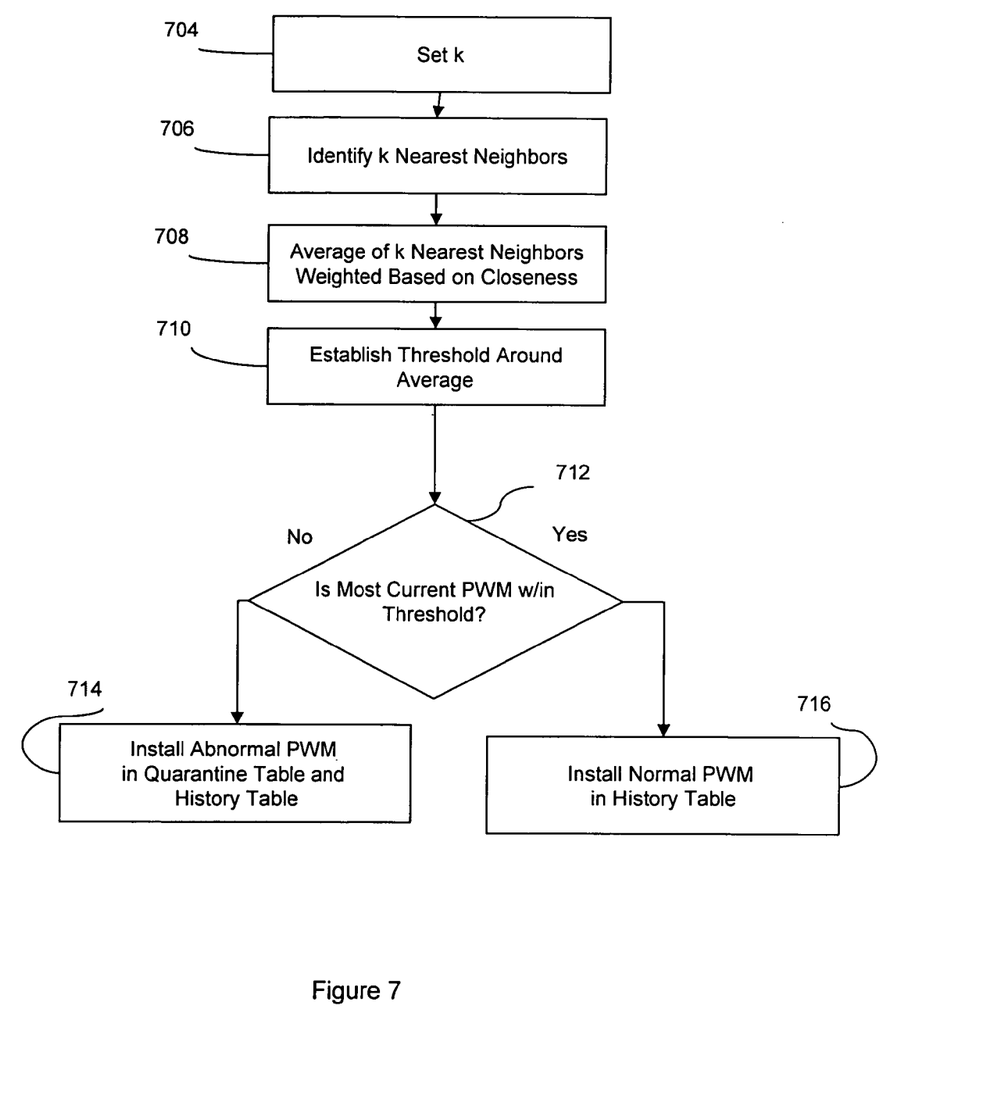
FIG. 7 is a schematic flow diagram further illustrating the method of FIG. 5.

Alternatively, referring to FIG. 7 and FIG. 3 in combination, in order to detect an abnormality (at process 514) in a current performance/workload measurement (e.g., 355 or 356) instead of comparing the current performance/workload measurement to a single entry in the history table, the processor 131 can be adapted to use a k-nearest neighbors approach. For example, in a k-nearest neighbors approach a predetermined number k (e.g., 3) of nearest neighbors is set (704) and the workload value of the current performance/workload value is compared to an average of the three nearest neighbors. The corresponding history table is reviewed in order to identify the three average performance/workload measurement entries (e.g., 312, 322, 332, 342, etc.) with workload values that are closest to the workload value of the current performance/workload measurement (706). For example, the current performance/workload measurement (355 or 356) has a workload value that is closest to the three workload values for average performance/workload measurements 312, 322, and 332. These average performance/workload measurements of the three nearest neighbors are averaged (708). The average can be a weighted average 352 based on relative closeness to the current performance/workload measurement. Once an average of the k-nearest neighbors is determined a threshold 350 is established around that weighted average 352 (710). Then, a determination is made as to whether the current performance/workload measurement is within that threshold (712). If the current value is within the threshold it is considered normal and imported into the corresponding history table, as described above with regard to process 612 (716).

If an abnormality is detected in a current performance/workload measurement for a given system component (e.g., at process 612 of FIG. 6 or 712 of FIG. 7), that measurement (e.g., measurement 226 of FIG. 2 or measurement 355 of FIG. 3) is input by the processor 131 (or one of a plurality of processors) into both the corresponding history table (e.g., 122a) and a corresponding quarantine table (e.g., 123a) in the data storage device 120 (614 of FIGS. 6 and 714 of FIG. 7). The quarantine tables 123a-c comprise records of detected abnormalities for the corresponding system components 105a-c. Specifically, the quarantine tables 123a-c are used to store the measurements that are deemed abnormal in relation to the other measurements in the history table and can further store the most recent average performance/workload measurement entries from the history table for the current workload value (i.e., the average measurement before the abnormal data point).

Referring again to FIG. 5, once an abnormality is detected and installed into the quarantine table (at process 614 or 714), a determination can be made as to the randomness of the abnormality and as to possible causes of the abnormality (518). For example, an abnormality threshold number can be determined. The number of times a particular abnormality is detected can be tallied and once that number reaches the abnormality threshold the determination can be made that the abnormality is true and not random. To facilitate making a determination as to whether or not an abnormality is random, directives can be issued to the agents to adjust tracking parameters for the performance/workload measurements (e.g., to decrease the interval at which the measurements are determined) (520). Possible causes of the detected abnormality can be determined based on the history of the system component and on the histories and the current performance/workload measurements of other system components in an invocation path of that system component. Additionally, after a detected abnormality, a report of the abnormality, including the possible causes, can be transmitted to a corrective actions engine (524). The corrective actions engine can be used to determine what if any corrective actions are necessary or prudent and to implement those corrective actions (526).

Alternate embodiments of the autonomic abnormality detection device and method of the invention could further define the compiled history for a system. For example, the device and method may include separate historical workload/performance mappings for each performance value (e.g., throughput, CPU utilization, etc.) such that each history table (e.g., history tables 122a-c of FIG. 1) would be specific not only to a component within a system, as described above, but also to a type of performance value. Such specific history tables would be beneficial in that searches for an approximately equal workload value can be weighted according to how workload values contribute to each performance value. For example, since request size will likely affect throughput more than CPU utilization, then a search for an approximately equal workload value to determine if the throughput or CPU utilization is abnormal should be weighted accordingly.

Therefore, disclosed above are a device and a method for periodically determining current workload to performance characteristics for different components of a system, for detecting an abnormality by comparing a current workload to performance characteristic to a dynamically compiled history of workload to performance characteristics, for determining a cause of the detected abnormality and for determining and implementing corrective actions, as necessary. More particularly, the device and method track two types of data, the workload imposed on a system and the resulting performance. By tracking this data over time, a database is built up of how the system reacts to different types of workloads. By comparing the current performance to the past performance that was experienced under similar workload conditions and contained in the database, abnormalities are detected. With knowledge of a system's components and how those components interact, the current and past states of the entire system are examined to determine possible causes of the abnormality. These possible causes are reported to a corrective actions engine (CAE), which determines corrective actions to fix the abnormality and implements those actions.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

What is claimed is:

1. An abnormality detection device for a system with a plurality of components, said abnormality detection device comprising:
   a server comprising a processor;
   a plurality of agents in communication with said components and with said server and wherein said agents are adapted to periodically determine current performance/workload measurements for each of said components and to periodically transmit said current performance/workload measurements to said server; and
   a data storage device in communication with said server;
   wherein said processor is adapted to dynamically compile a history of performance/workload measurements for each of said components and to compare said current performance/workload measurement for each of said components to said history for each of said components so as to detect an abnormality,
   wherein said data storage device stores said current performance/workload measurements for each of said components, said history for each of said components, and a record of detected abnormalities for each of said components,
   wherein said processor is further adapted to compile said history by clustering performance/workload measurements for each of said components into clusters and determining an average performance/workload measurement for each of said clusters,
   wherein each of said performance/workload measurements comprises a workload value, and wherein for each of said components said processor is adapted to detect an abnormality by:
   identifying a predetermined number of said average performance/workload measurements having workload values closest to said workload value of said current performance/workload measurement;
   determining a combined average of said predetermined number of said average performance/workload measurements; and
   determining if said current performance/workload measurement is greater than a predetermined value from said combined average of said predetermined number of said average performance/workload measurements.

2. The device of claim 1, wherein each of said performance/workload measurements comprises a workload value, and wherein for each of said components said processor is adapted to detect an abnormality by:
   identifying one average performance/workload measurement in which said workload value is approximately equal to said workload value of said current performance/workload measurement; and
   determining if said current performance/workload measurement is greater than a predetermined value from said one average performance/workload measurement.

3. The device of claim 1, wherein said processor is further adapted to determine said average performance/workload measurement for each of said clusters by using at least one of a weighted average and a decay function to allow for changes in normal operation of each of said components over time.

4. The device of claim 1, wherein said processor is further adapted to analyze said record of detected abnormalities for each of said components to determine if said abnormality in said current performance/workload measurement is random.

5. The device of claim 1, wherein said server is further adapted to issue directives to said agents to adjust tracking parameters for said performance/workload measurements.

6. The device of claim 1, wherein said processor is further adapted to determine a possible cause of an abnormality detected in a current performance/workload measurement of one component based on said history of said one component and on said histories and said current performance/workload measurements of other components in an invocation path of said one component.

7. The device of claim 1, further comprising an engine in communication with said server and adapted to receive a report of a detected abnormality, to determine what if any corrective actions are necessary, and to implement said corrective actions in said system.

8. A method of detecting abnormalities in a system with a plurality of components, said method comprising:

using a plurality of agents to periodically determine a current performance/workload measurement for each of said components;

dynamically compiling a history of performance/workload measurements for each of said components;

comparing said current performance/workload measurement for each of said components to said history for each of said components to detect an abnormality in said current performance/workload measurement for each of said components; and for each of said components, storing said current performance/workload measurements, said histories, and a record of detected abnormalities;

wherein said histories are compiled by clustering performance/workload measurements for each of said components into clusters and determining an average performance/workload measurement for each of said clusters, and wherein each of said performance/workload measurements comprises a workload value, and wherein said method further comprises detecting an abnormality by:

identifying a predetermined number of said average performance/workload measurements having workload values closest to said workload value of said current performance/workload measurement;

determining a combined average of said predetermined number of said average performance/workload measurements; and determining if said current performance/workload measurement is greater than a predetermined value from said combined average of said predetermined number of said average performance/workload measurements.

9. The method of claim 8, wherein each of said performance/workload measurements comprises a workload value, and wherein said method further comprises detecting an abnormality in said current performance/workload measurement of one component by:

identifying one average performance/workload measurement for said one component in which said workload value is approximately equal to said workload value of said current performance/workload measurement of said one component; and determining if said current performance/workload measurement is greater than a predetermined value from said one average performance/workload measurement.

10. The method of claim 8, wherein said determining of said average performance/workload measurement for each of said clusters comprises using at least one of a weighted average and a decay function to allow for changes in normal operation of each of said components over time.

11. The method of claim 8, further comprising issuing directives to said agents to adjust tracking parameters for said performance/workload measurements.

12. The method of claim 8, further comprising determining a possible cause of a detected abnormality in a current performance/workload measurement of one component based on said history of said one component and on said histories and said current performance/workload measurements of other components in an invocation path of said one component.

13. A program storage device readable by a computer, tangibly embodying a program of instructions executable by said computer to perform a method of detecting abnormalities in a system with a plurality of components, said method comprising:

using a plurality of agents to periodically determine a current performance/workload measurement for each of said components;

dynamically compiling a history of performance/workload measurements for each of said components;

comparing said current performance/workload measurement to said history to detect an abnormality in said current performance/workload measurement for each of said components; and for each of said components, storing said current performance/workload measurements, said histories, and a record of detected abnormalities; wherein said histories are compiled by clustering performance/workload measurements for each of said components into clusters and determining an average performance/workload measurement for each of said clusters;

wherein said histories are compiled by clustering performance/workload measurements for each of said components into clusters and determining an average performance/workload measurement for each of said clusters, wherein each of said performance/workload measurements comprises a workload value, and wherein said method further comprises detecting an abnormality by:

identifying a predetermined number of said average performance/workload measurements having workload values closest to said workload value of said current performance/workload measurement;

determining a combined average of said predetermined number of said average performance/workload measurements; and determining if said current performance/workload measurement is greater than a predetermined value from said combined average of said predetermined number of said average performance/workload measurements.

14. The program storage device of claim 13 wherein each of said performance/workload measurements comprises a workload value, and wherein said method further comprises detecting an abnormality in said current performance/workload measurement of one component by:

identifying one average performance/workload measurement in which said workload value is approximately equal to said workload value of said current performance/workload measurement of said one component; and determining if said current performance/workload measurement is greater than a predetermined value from said one average performance/workload measurement.

* * * * *